United States Patent
Park et al.

(10) Patent No.: US 9,420,553 B2
(45) Date of Patent: Aug. 16, 2016

(54) METHOD AND APPARATUS FOR OPERATING PLURAL TIME ALIGNMENT TIMERS IN WIRELESS COMMUNICATION SYSTEM USING COORDINATED MULTIPOINT TECHNOLOGY

(71) Applicant: LG ELECTRONICS INC., Seoul (KR)

(72) Inventors: Jonghyun Park, Anyang-si (KR); Hakseong Kim, Anyang-si (KR); Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 91 days.

(21) Appl. No.: 14/372,181

(22) PCT Filed: Jan. 18, 2013

(86) PCT No.: PCT/KR2013/000404
§ 371 (c)(1),
(2) Date: Jul. 14, 2014

(87) PCT Pub. No.: WO2013/109084
PCT Pub. Date: Jul. 25, 2013

(65) Prior Publication Data
US 2015/0003305 A1 Jan. 1, 2015

Related U.S. Application Data

(60) Provisional application No. 61/588,150, filed on Jan. 18, 2012.

(51) Int. Cl.
| | |
|---|---|
| *H04J 3/00* | (2006.01) |
| *H04W 56/00* | (2009.01) |
| *H04L 5/00* | (2006.01) |
| *H04L 5/14* | (2006.01) |

(52) U.S. Cl.
CPC ......... *H04W 56/0005* (2013.01); *H04L 5/0048* (2013.01); *H04L 5/14* (2013.01); *H04W 56/0045* (2013.01)

(58) Field of Classification Search
CPC ............... H04W 56/0045; H04W 56/0005; H04L 5/0048; H04L 5/14
USPC .................................. 370/280, 336
See application file for complete search history.

(56) References Cited

U.S. PATENT DOCUMENTS

| | | | | |
|---|---|---|---|---|
| 2011/0058505 | A1* | 3/2011 | Pan | H04J 11/005 370/280 |
| 2013/0242958 | A1* | 9/2013 | Dinan | H04W 72/0453 370/336 |
| 2014/0016559 | A1* | 1/2014 | Jang | H04L 5/001 370/328 |

FOREIGN PATENT DOCUMENTS

| | | |
|---|---|---|
| JP | 2011-250386 | 12/2011 |
| KR | 10-2009-0116590 | 11/2009 |
| WO | 2011/068367 | 6/2011 |
| WO | 2011/085200 | 7/2011 |
| WO | 2011/099970 | 8/2011 |

OTHER PUBLICATIONS

PCT International Application No. PCT/KR2013/000404, Written Opinion of the International Searching Authority dated Apr. 23, 2013, 1 page.

* cited by examiner

*Primary Examiner* — Mang Yeung
(74) *Attorney, Agent, or Firm* — Lee Hong Degerman Kang & Waimey; Jonathan Kang; Jeffrey Lotspeich

(57) ABSTRACT

Defined are timings at which a user equipment transmits uplink signals to a plurality of base stations in a wireless communication system to which a coordinated multipoint (CoMP) technology is applied. Specifically, a method of controlling uplink signal transmission timings to prevent collision between timings in transmission of uplink signals to the base stations is disclosed.

13 Claims, 12 Drawing Sheets

Fig. 7
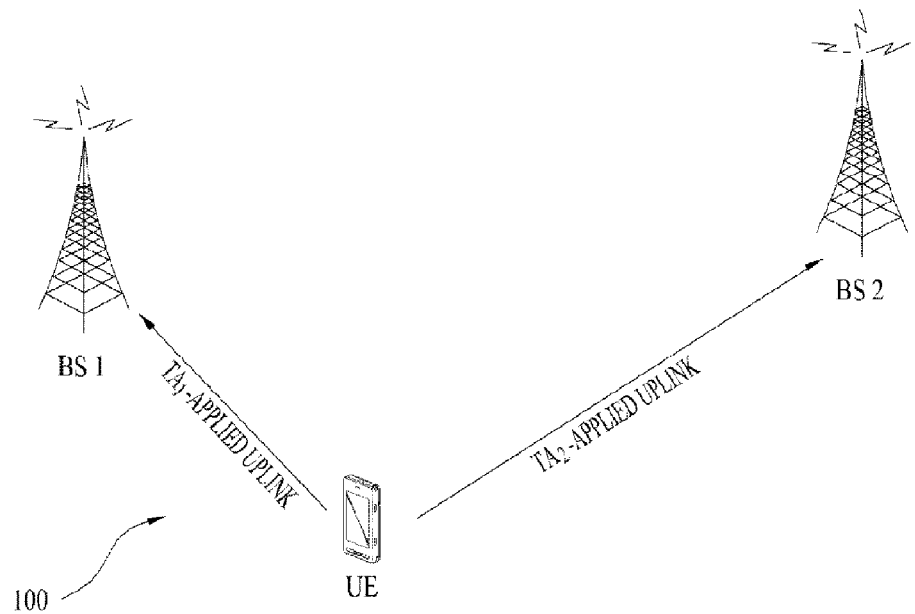
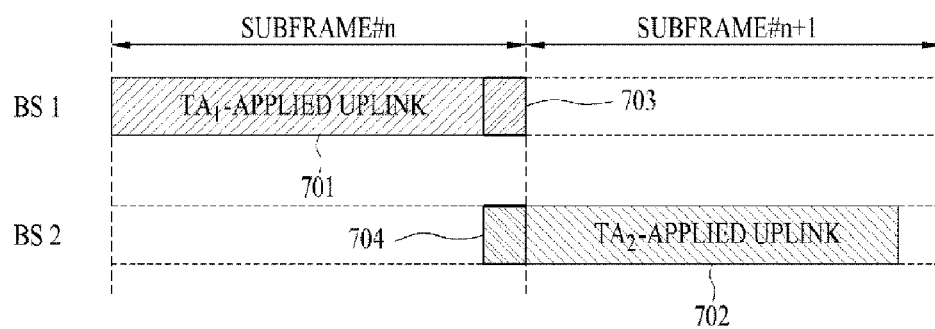

Fig. 11
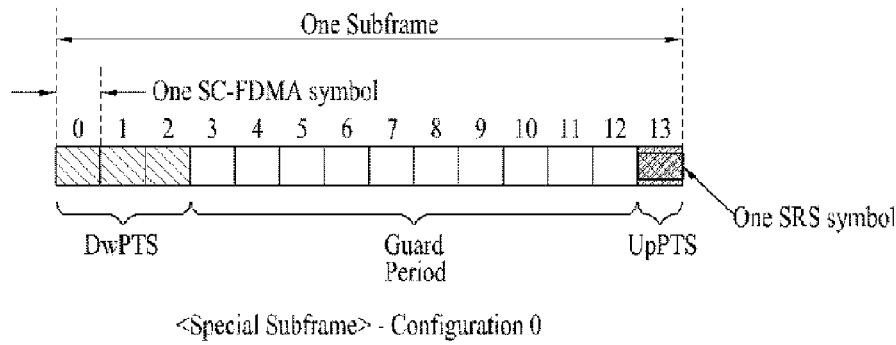
(a)
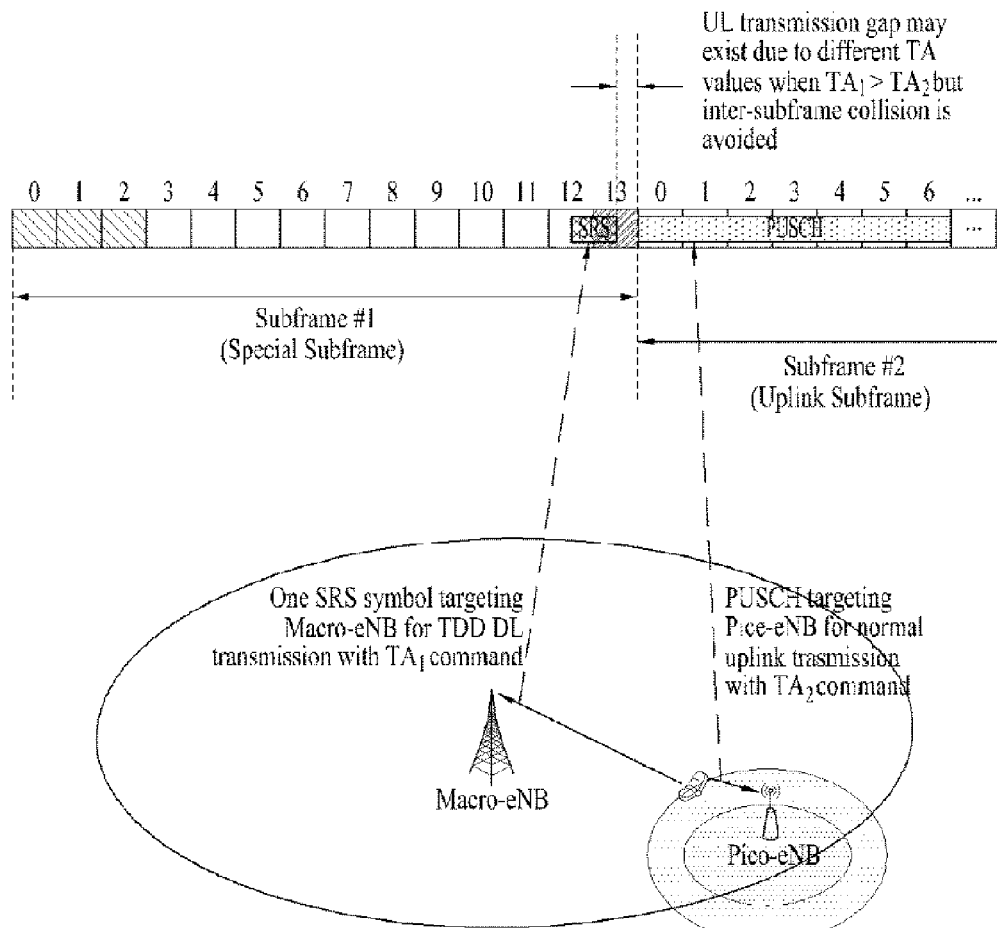
(b)

METHOD AND APPARATUS FOR OPERATING PLURAL TIME ALIGNMENT TIMERS IN WIRELESS COMMUNICATION SYSTEM USING COORDINATED MULTIPOINT TECHNOLOGY

CROSS-REFERENCE TO RELATED APPLICATIONS

This application is the National Stage filing under 35 U.S.C. 371 of International Application No. PCT/KR2013/000404, filed on Jan. 18, 2013, which claims the benefit of U.S. Provisional Application Ser. No. 61/588,150, filed on Jan. 18, 2012, the contents of which are hereby incorporated by reference herein in their entirety.

TECHNICAL FIELD

The present invention relates to a wireless communication system, and more particularly, to a method of operating a plurality of time alignment timers in a case in which a User Equipment uses the time alignment timers while the User Equipment transmits and receives data signals to and from a plurality of Base Stations in a Long Term Evolution (LTE) system.

BACKGROUND ART

In a general wireless communication system, a User Equipment may transmit and receive a data signal to and from a Base Station. In recent years, a coordinated multipoint technology has been proposed to increase transmission and receiving speed of data.

The coordinated multipoint technology is a kind of technology that is capable of enabling a user equipment to transmit and receive data to and from a plurality of base stations. In a case in which a user equipment transmits and receives data to and from a plurality of base stations, transmission and receiving speed of data may be improved as compared with in a case in which a user equipment transmits and receives data to and from a base station.

In a case in which a user equipment transmits and receives data to and from a plurality of base stations based on the coordinated multipoint technology, distances between the base stations and the user equipment may be different from each other. When the user equipment transmits uplink signals to the base stations, it may be difficult to apply uniform timing due to such distance difference.

Therefore, there is a high necessity to newly define timings at which a user equipment transmits uplink data to a plurality of base stations in a wireless communication system to which a coordinated multipoint technology is applied.

DISCLOSURE OF INVENTION

Technical Problem

An object of the present invention devised to solve the problem lies on a method of defining uplink signal transmission timings to solve a problem caused due to distance difference between a user equipment and a plurality of base stations when the user equipment transmits uplink signals to the base stations in a wireless communication system to which a coordinated multipoint technology is applied.

Objects of the present invention devised to solve the problem are not limited to the aforementioned object, and unmentioned other objects and features will be understood by those of ordinary skill in the art to which the present invention pertains based on the following detailed description of the present invention.

Solution to Problem

In accordance with an aspect of the present invention, the above and other objects can be accomplished by the provision of a method of a User Equipment (UE) performing uplink transmission in a wireless communication system, the method including receiving a first timing advance (TA) applied to transmission of a first sounding reference signal (SRS) and a second TA applied to transmission of uplink data from a first base station and transmitting the first SRS according to a timing decided based on the first TA and transmitting the uplink data according to a timing decided based on the second TA.

In accordance with another aspect of the present invention, there is provided a UE to perform uplink transmission in a wireless communication system, the UE including a receiving module to receive a downlink signal from a base station, a transmitting module to transmit an uplink signal to the base station, and a processor connected to the receiving module and the transmitting module to control an operation of the UE, wherein the processor is configured to receive a first timing advance (TA) applied to transmission of a sounding reference signal (SRS) and a second TA applied to transmission of uplink data from a first base station through the receiving module and to transmit the SRS according to a timing decided based on the first TA and transmit the uplink data according to a timing decided based on the second TA through the transmitting module.

The above embodiments of the present invention may be configured as follows.

The first SRS may be transmitted to the first base station, and the uplink data may be transmitted to a second base station.

The first SRS may be an SRS conforming to a first transmission rule to periodically transmit SRSs, the second SRS may be an SRS conforming to a second transmission rule, and the second SRS or a Physical Uplink Control Channel (PUCCH) may be transmitted according to the timing decided based on the second TA.

The first transmission rule or the second transmission rule may be a UE Specific SRS configuration.

The wireless communication system may be a Time Division Duplex (TDD) system, and the first transmission rule may be configured such that the first SRS is transmitted from an Uplink Pilot Time Slot (UpPTS) of a special subframe.

The first transmission rule may have an SRS transmission cycle value configured to n*5 ms (n is an integer) and an SRS transmission offset value configured to a position value of the special subframe such that the SRS is transmitted from the special subframe.

The first TA may be a bias value of the second TA.

In a case in which a transmission section of the uplink data overlaps with a transmission section of the first SRS due to a difference between values of the first TA and the second TA, a symbol length of the first SRS may be reduced.

In a case in which the overlapping transmission section is greater than half a length of a Single Carrier frequency-division multiple access Symbol (SC-FDMA Symbol), rate matching of the uplink data may be performed.

The uplink data may be transmitted to the base station through a Physical Uplink Shared Channel (PUSCH).

The above general description of the present invention and a detailed description of the present invention, which will hereinafter be described, are illustrative and provided for a further description of the invention recited in claims.

Advantageous Effects of Invention

In a wireless communication system to which a coordinated multipoint (CoMP) technology is applied, interference between uplink signals transmitted from a user equipment to a plurality of base stations is minimized.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention. In the drawings:

FIG. 7 is a view showing a wireless communication system according to an embodiment of the present invention to which independent timing is applied for each Base Station and a problem which may be generated in this system;

FIG. 11 is a view illustrating an embodiment of the present invention in a case in which a sounding reference signal is transmitted through a special subframe of a Time Division Duplex (TDD) system.

BEST MODE FOR CARRYING OUT THE INVENTION

Figure 1:
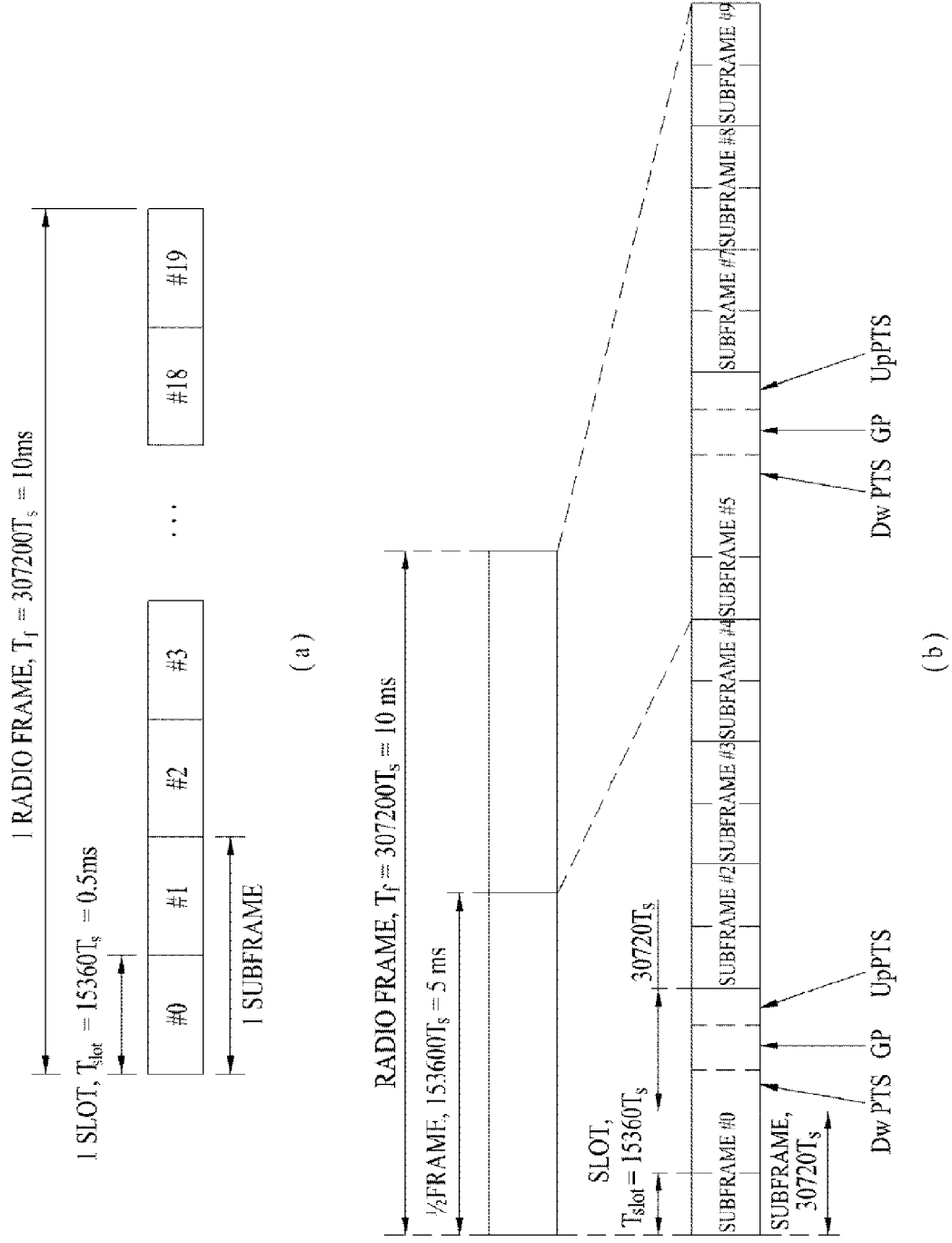
FIG. 1 is a view showing an example of a wireless frame structure used in a wireless communication system.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters.

In some cases, in order to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In embodiments of the present invention, a User Equipment (UE) may be fixed or moved. A UE includes various devices that communicate with a Base Station (BS) to transmit and receive user data and/or various kinds of control information to and from the BS. A UE may be referred to as a Terminal Equipment, Mobile Station (MS), Mobile Terminal (MT), User Terminal (UT), Subscribe Station (SS), wireless device, Personal Digital Assistant (PDA), wireless modem, or handheld device. Also, in embodiments of the present invention, a Base Station (BS) is a fixed station that generally communicates with a UE or another BS. A BS communicates with a UE or another BS to exchange various kinds of data and control information with a UE or another BS. A BS may be referred to as an Advanced Base Station (ABS), Node-B (NB), evolved-NodeB (eNB), Base Transceiver System (BTS), Access Point, or Processing Server (PS).

In embodiments of the present invention, a node is a fixed point that communicates with a user equipment to transmit or receive a wireless signal to or from the user equipment. Various base stations may be used as a node irrespective of names thereof. For example, a BS, NB, eNB, pico-cell eNB (PeNB), home eNB (HeNB), relay, or repeater may be used as a node. Also, a BS may not be used as a node. For example, a radio remote head (RRH) or radio remote unit (RRU) may be used as a node. At least one antenna is installed at a node. The antenna may be a physical antenna. Alter-natively, the antenna may be an antenna port, virtual antenna, or an antenna group. The node may be referred to as a point. In a conventional centralized antenna system (CAS) (that is, single node system), antennas are centralized in a base station such that the antennas are controller by a single BS controller. In a multiple node system, on the other hand, a plurality of nodes is generally disposed at predetermined intervals. The nodes may be managed by one or more BS or BS controllers that control operations of the respective nodes or schedule data to be transmitted or received through the respective nodes. Each node may be connected to a BS or BS controller that controls the corresponding node via a cable or dedicated line. In the multiple node system, the same cell identifier (ID) or different cell IDs may be used to transmit or receive a signal to or from a plurality of nodes. In a case in which a plurality of nodes has the same cell ID in the multiple node system, each node serves as a group of some antennas of one cell. In a case in which a plurality of nodes has different cell IDs in the multiple node system, on the other hand, the multiple node system may be considered as a multiple cell (e.g., macro-cell, femto-cell, or pico-cell) system.

Meanwhile, in embodiments of the present invention, a cell is a predetermined geographical area in which one or more nodes provide a communication service. Therefore, communication with a specific cell may be communication with a BS or node that provides a communication service to the specific cell. Also, a downlink or uplink signal of a specific cell may be a downlink or uplink signal from or to a BS or node that provides a communication service to the specific cell. Also, channel status or quality of a specific cell may be channel status or quality of a channel or a communication link formed between a BS or node that provides a communication service to the specific cell and a UE.

In embodiments of the present invention, a Physical Downlink Control Channel (PDCCH), Physical Control Format Indicator Channel (PCFICH), Physical Hybrid automatic retransmit request Indicator Channel (PHICH), or Physical Downlink Shared Channel (PDSCH) is a set of time-frequency resources or resource elements to carry Downlink Control Information (DCI), Control Format Indicator (CFI), downlink ACKnowlegement/Negative ACK (ACK/NACK), or downlink data. Also, a Physical Uplink Control Channel (PUCCH), Physical Uplink Shared Channel (PUSCH), or Physical Random Access CHannel (PRACH) is a set of time-frequency resources or resource elements to carry Uplink Control Information (UCI), uplink data, or a random access signal. In embodiments of the present invention, a time-frequency resource or resource element (RE) assigned to or belonging to a PDCCH, PCFICH, PHICH, PDSCH, PUCCH, PUSCH, or PRACH is referred to as a PDCCH, PCFICH, PHICH, PDSCH, PUCCH, PUSCH, or PRACH RE or a PDCCH, PCFICH, PHICH, PDSCH, PUCCH, PUSCH, or PRACH resource. Hereinafter, a UE transmitting a PUCCH, PUSCH, or PRACH may be transmission of uplink control information, uplink data, or a random access signal on or through a PUCCH, PUSCH, or PRACH. Also, a BS transmitting a PDCCH, PCFICH, PHICH, or PDSCH may be transmission of downlink data or control information on or through a PDCCH, PCFICH, PHICH, or PDSCH.

FIG. 1 is a view showing an example of a wireless frame structure used in a wireless communication system. Specifically, FIG. 1(a) shows a Frequency Division Duplex (FDD) frame structure used in a Third Generation Partnership Project Long Term Evolution/Long Term Evolution-Advanced (3GPP LTE/LTE-A) system, and FIG. 1(b) shows a Time Division Duplex (TDD) frame structure used in the 3GPP LTE/LTE-A system.

Referring to FIG. 1, a wireless frame used in the 3GPP LTE/LTE-A system has a length of 10 ms (307200 $T_s$). A wireless frame includes 10 subframes (SF) having the same size. 10 subframes in one wireless frame may be numbered. Where, $T_s$ indicates sampling time, and $T_s=1/(2048*15$ kHz$)$. Each subframe has a length of 1 ms. Each subframe includes two slots. 20 slots in one wireless frame may be successively numbered from 0 to 19. Each slot has a length of 0.5 ms. Time to transmit one subframe is defined as a transmission time interval (TTI). Time resources may be sorted by wireless frame numbers (or wireless frame indexes), subframe numbers (or subframe indexes), and slot numbers (or slot indexes).

A wireless frame may be differently configured according to a duplex mode. For example, in a FDD mode, downlink transmission and uplink transmission are sorted by frequency. Consequently, a wireless frame includes only a downlink subframe or an uplink subframe with respect to a specific frequency band. In a TDD mode, downlink transmission and uplink transmission are sorted by time. Consequently, a wireless frame includes both a downlink subframe and an uplink subframe with respect to a specific frequency band.

Table 1 shows DL-UL configuration of subframes in a wireless frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D indicates a downlink subframe, U indicates an uplink subframe, and S indicates a special subframe. The special subframe includes three fields, such as Downlink Pilot TimeSlot (DwPTS), Guard Period (GP), and Uplink Pilot TimeSlot (UpPTS). DwPTS is a time section reserved for downlink transmission, and UpPTS is a time section reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
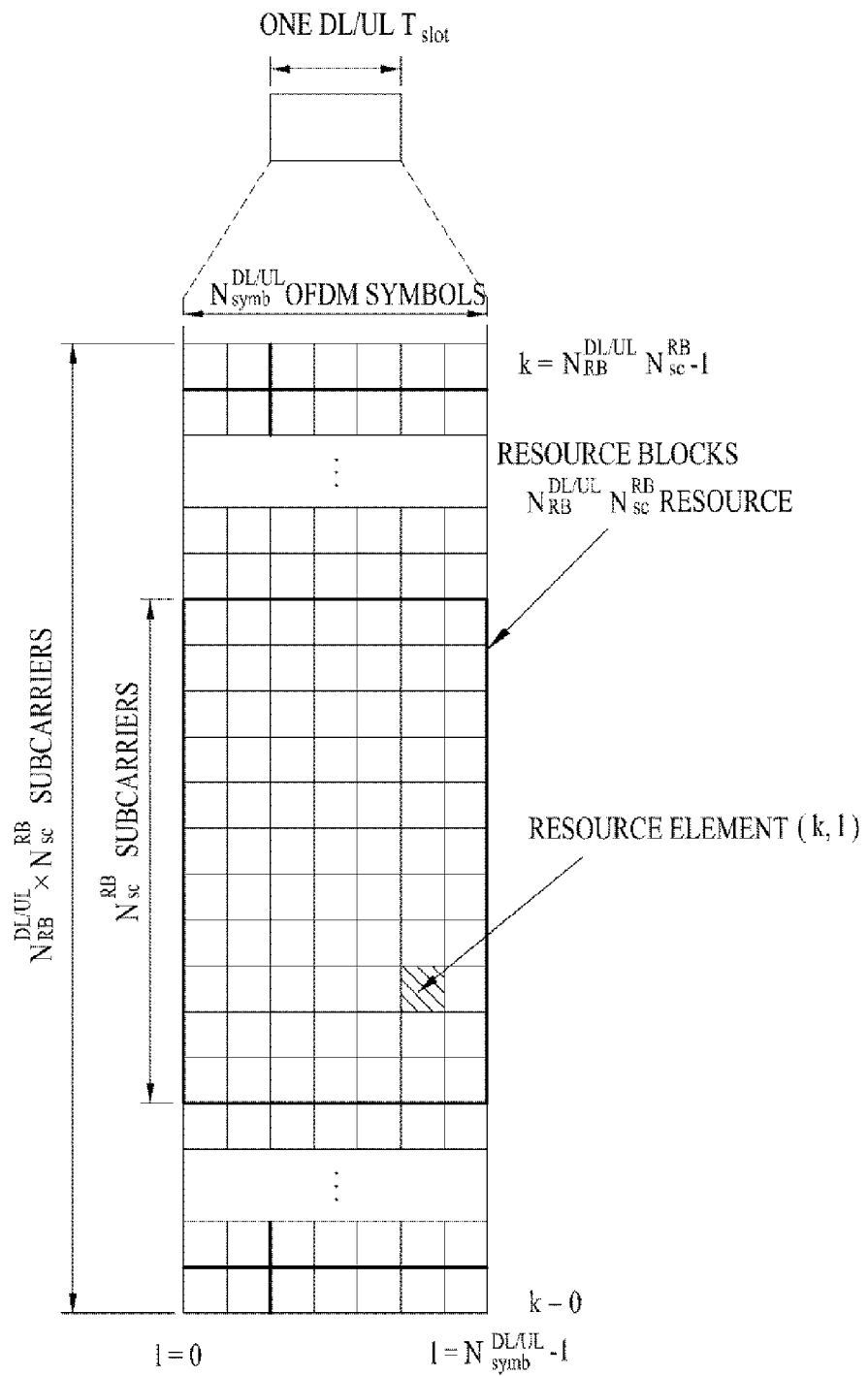
FIG. 2 is a view showing an example of a downlink (DL) or uplink (UL) slot structure in a wireless communication system.

FIG. 2 is a view showing an example of a downlink (DL) or uplink (UL) slot structure in a wireless communication system. Specifically, FIG. 2 shows the structure of a resource grid of a 3GPP LTE/LTE-A system. One resource grid is provided for each antenna port.

Referring to FIG. 2, a time domain includes a plurality of Orthogonal Frequency Division Multiplexing (OFDM) symbols, and a frequency domain includes a plurality of resource blocks (RB). Each OFDM symbol may mean one symbol section.

Referring to FIG. 2, a signal transmitted from each slot may be expressed by a resource grid including NDL/ULRB*NRBsc subcarriers and NDL/ULsymb OFDM symbols. Where, NDLRB indicates the number of resource blocks (RB) in a downlink slot, and NULRB indicates the number of resource blocks (RB) in a UL slot. NDLRB and NULRB depend upon a DL transmission bandwidth and a UL transmission bandwidth, respectively. NDLsymb indicates the number of OFDM symbols in a downlink slot, and NULsymb indicates the number of OFDM symbols in a UL slot. NRBsc indicates the number of subcarriers constituting one RB.

OFDM symbols may be referred to as OFDM symbols or SC-FDM symbols according to a multiple access method. The number of OFDM symbols included in one slot may be variously changed depending upon a channel bandwidth and the length of a Cylic Prefix (CP). For example, in a normal CP, one slot includes seven OFDM symbols. In an extended CP, on the other hand, one slot includes six OFDM symbols. In FIG. 2, a subframe having seven OFDM symbols for each slot is shown for the convenience of description. However, embodiments of the present invention may be applied to subframes having different number of OFDM symbols in the same manner. Referring to FIG. 2, each OFDM symbol includes NDL/ULRB*NRBsc subcarriers in a frequency domain. Subcarriers may be classified into a data subcarrier for data transmission, a reference signal subcarrier for reference signal transmission, and a null subcarrier for a guard band and direct current (DC) component. The null subcarrier for the direct current (DC) component is an unused subcarrier. The null subcarrier for the direct current (DC) component is mapped into a carrier frequency (f0) during an OFDM signal generation process or a frequency up-converting process. The carrier frequency may be referred to as a center frequency.

One RB is defined as successive NDL/ULsymb (for example, seven) OFDM symbols in a time domain and as successive NRBsc (for example, twelve) subcarriers in a frequency domain. For reference, a resource including one OFDM symbol and one subcarrier is referred to as a resource element (RE) or a tone. Consequently, One RB includes NDL/ULsymb*NRBsc resource elements. Each resource element in a resource grid may be inherently defined by an index pair (k, 1) in one slot. Where, k indicates indexes given from 0 to NDL/ULRB*NRBsc−1 in a frequency domain, and 1 indicates indexes given from 0 to NDL/ULsymb−1 in a time domain.

In one subframe, two RBs respectively located in two slots of the subframe while occupying successive NRBsc same subcarriers are referred to as a physical resource block (PRB) pair. Two RBs constituting a PRB pair have the same PRB number (or PRB index).

Figure 3:
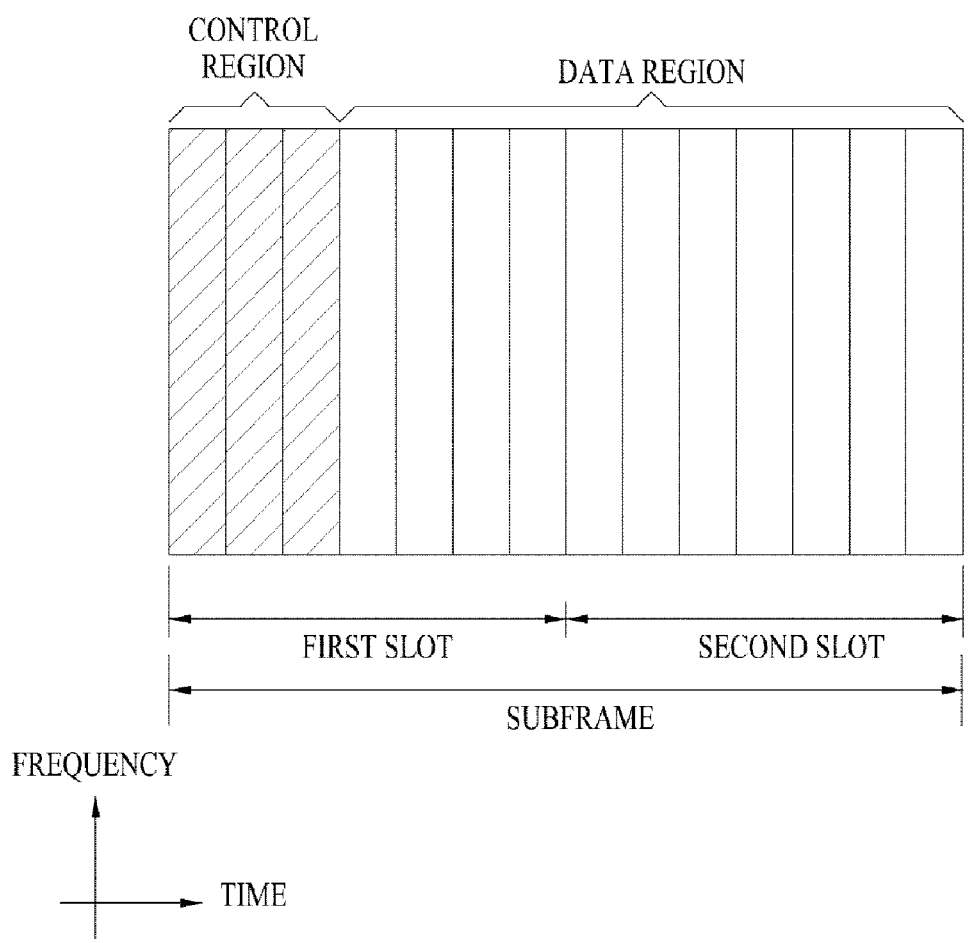
FIG. 3 is a view showing an example of a DL subframe structure used in a Third Generation Partnership Project Long Term Evolution/Long Term Evolution-Advanced (3GPP LTE/LTE-A) system.

FIG. 3 is a view showing an example of a DL subframe structure used in a 3GPP LTE/LTE-A system.

Referring to FIG. 3, a DL subframe may be divided into a control region and a data region in a time domain. Referring to FIG. 3, maximum three (or four) front OFDM symbols in a first slot of the subframe correspond to the control region, to which control channels are assigned. Hereinafter, a resource region of the DL subframe available for PDCCH transmission will be referred to as a PDCCH region. The other OFDM symbols, which are not used as the control region, correspond to the data region, to which a Physical Downlink Shared Channel (PDSCH) is assigned. Hereinafter, a resource region of the DL subframe available for PDSCH transmission will be referred to as a PDSCH region. Examples of DL control channels used in 3GPP LTE include a Physical Control Format Indicator Channel (PCFICH), Physical Downlink Control Channel (PDCCH), and Physical hybrid ARQ indicator Channel (PHICH). PCFICH carries information regarding the number of OFDM symbols transmitted from the first OFDM symbol of a subframe and used to transmit a control channel in the subframe. PHICH carries a Hybrid Automatic Repeat Request acknowledgment/negative-acknowledgment (HARQ ACK/NACK) signal in response to UL transmission.

Control information transmitted through PDCCH is referred to as Downlink Control Information (DCI). DCI includes resource assignment information for a UE or UE group and other Control Information. For example, DCI includes transmission format and resource assignment information of a downlink shared channel (DL-SCH), transmission format and resource assignment information of an uplink shared channel (UL-SCH), paging information on a paging channel (PCH), system information on DL-SCH, resource assignment information of an upper layer control message, such as arbitrary connection response, transmitted on PDSCH, a Transmit Control Command Set regarding individual UEs in a UE group, a Transmit Power Control (TPC) command, Voice over IP (VoIP) activation instruction information, and a Downlink Assignment Index (DAI). Transmission format and resource assignment information of a downlink shared channel (DL-SCH) is also referred to as DL scheduling information or DL grant, and transmission format and resource assignment information of an uplink shared channel (UL-SCH) is also referred to as UL scheduling information or UL grant.

PDCCH is transmitted on a control channel element (CCE) or an aggregation of successive CCEs. CCE is a logical assignment unit used to provide a coding rate based on a wireless channel status to PDCCH. CCE corresponds to a plurality of resource element groups (REGs). For example, one CCE corresponds to nine REGs, and one REG corresponds to four REs. In a 3GPP LTE system, a CCE set in which PDCCH can be located for each UE is defined. A CCE set from which a UE can find its own PDCCH is referred to a PDCCH search space or simply a search space (SS). An individual resource, to which PDCCH can be transmitted in the search space, is referred to a PDCCH candidate. A set of PDCCH candidates to be monitored by a UE is defined as a search space. In a 3GPP LTE/LTE-A system, search spaces for DCI format may have different sizes. A dedicated search space and a common search space are defined. The dedicated search space is a UE-specific search space. The dedicated search space is configured for each individual UE. The common search space is configured for a plurality of UEs. One PDCCH candidate corresponds to one, two, four, or eight CCEs according to a CCE aggregation level. A BS transmits real PDCCH (DCI) on an arbitrary PDCCH candidate in a search space, and UE monitors the search space to find the PDCCH (DCI). Monitoring means attempt to decode individual PDCCH in a corresponding search space according to all monitored DCI formats. A UE may monitor a plurality of PDCCHs to detect its own PDCCH. Because a UE does not basically know a position from which its own PDCCH is transmitted, the UE attempts to decode all PDCCHs of a corresponding DCI format every subframe until the UE detects a PDCCH having an identifier thereof. This procedure is referred to as blind decoding (BD).

A BS may transmit data for a UE or a UE group through a data region. Data transmitted through the data region may also be referred to user data. To transmit user data, a Physical Downlink Shared CHannel (PDSCH) may be assigned to the data region. A Paging channel (PCH) and a Downlink-shared channel (DL-SCH) are transmitted through a PDSCH. A UE may decode control information transmitted through a PDCCH to read data transmitted through a PDSCH. DCIs carried by one PDCCH have different sizes and functions according to DCI format. The size of the DCIs may be changed according to a coding rate. Information regarding to which UE or UE group PDSCH data are transmitted and how the UE or UE group receives and decodes the PDSCH data is transmitted in a state in which the information is included in PDCCH. For example, it is assumed that a specific PDCCH is Cyclic redundancy check (CRC) masked with a Radio Network Temporary Identity (RNTI) of "A", and information regarding data transmitted using a wireless resource (for example, frequency position) of "B" and transmission type information (for example, transmission block size, modulation method, coding information, etc.) of "C" is transmitted through a specific DL subframe. A UE monitors PDCCH using RNTI information held by the UE. A UE having an RNTI of "A" detects PDCCH, and receives PDSCH indicated by "B" and "C" through information of the received PDCCH.

Figure 4:
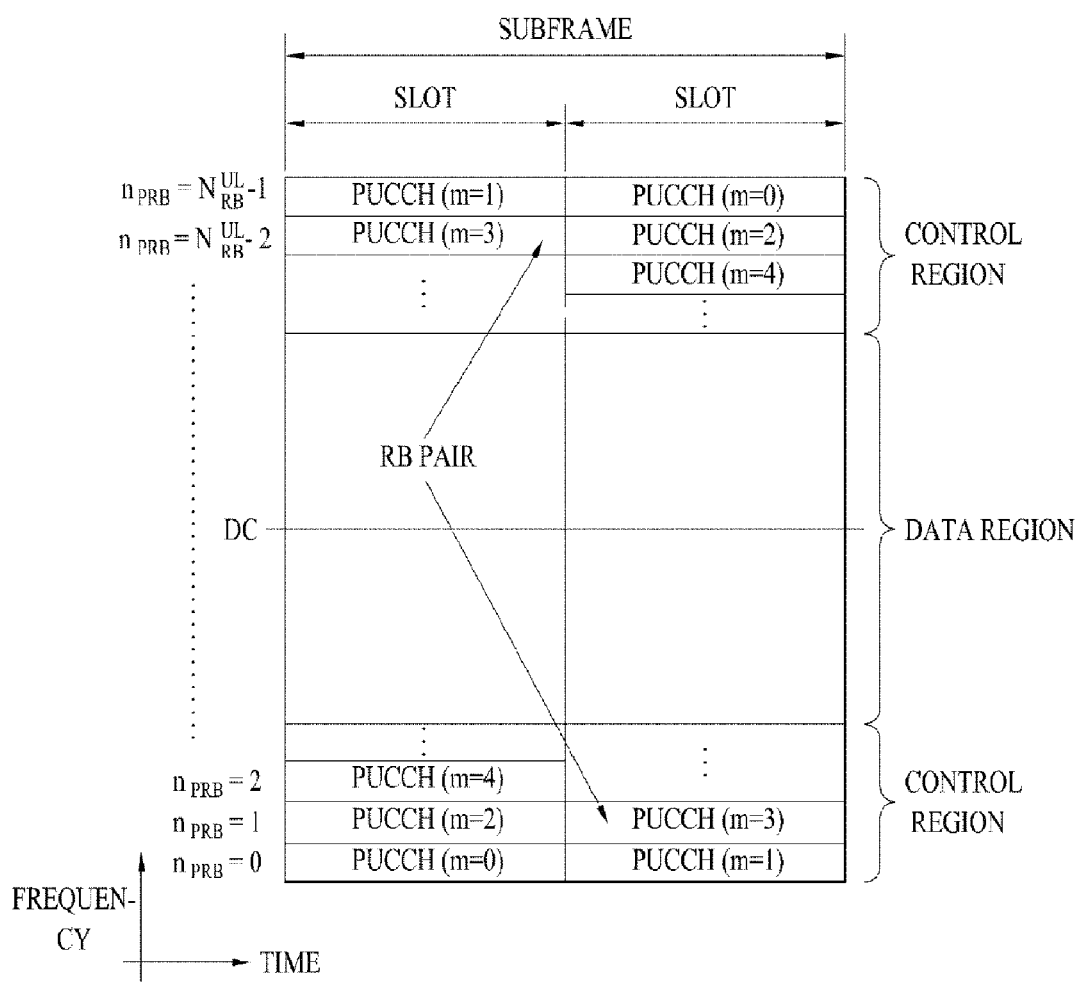
FIG. 4 is a view showing an example of a UL subframe structure used in the 3GPP LTE/LTE-A system.

FIG. 4 is a view showing an example of an uplink subframe structure used in the 3GPP LTE/LTE-A system.

Referring to FIG. 4, a UL subframe may be divided into a control region and a data region in a frequency domain. One or several physical uplink control channels (PUCCHs) may be assigned to the control region of the UL subframe to carry uplink control information (UCI). One or several physical uplink shared channels (PUSCHs) may be assigned to the data region of the UL subframe to carry user data. The control region and the data region of the UL subframe may be referred to as a PUCCH region and a PUSCH region, respectively. A sounding reference signal (SRS) may be assigned to the data region. In a time domain, an SRS is transmitted on the rearmost OFDM symbol of the UL subframe. In a frequency domain, an SRS is transmitted on a data transmission band, i.e. the date region, of the UL subframe. SRSs of several UEs transmitted or received on the rearmost OFDM symbol of the same subframe may be sorted according to frequency position or sequence.

In a case in which a UE adopts an SC-FDMA method in UL transmission, a 3GPP LTE release 8 or 9 system cannot simultaneously transmit a PUCCH and a PUSCH on one carrier to maintain single carrier characteristics. In a 3GPP LTE release 10 system, whether a PUCCH and a PUSCH can be simultaneously transmitted may be instructed by an upper layer.

In the UL subframe, subcarriers distant from a direct current (DC) subcarrier are utilized as a control region. In other words, subcarriers located at opposite ends of a UL transmission bandwidth are assigned to transmit uplink control information. The DC subcarrier is a component which is not used to transmit signals. The DC subcarrier is mapped into a carrier frequency (f0) during a frequency up-converting process. PUCCH of one UE is assigned to an RB pair belonging to resources operated in one subcarrier frequency in one subframe. RBs belonging to the RB pair occupy different subcarriers in two slots. The PUCCH assigned as described above is expressed as the RB pair assigned to the PUCCH being frequency hopped at a slot interface. In a case which frequency hopping is not applied, on the other hand, the RB pair occupies the same subcarrier.

Description of Timing Advance

Figure 5:
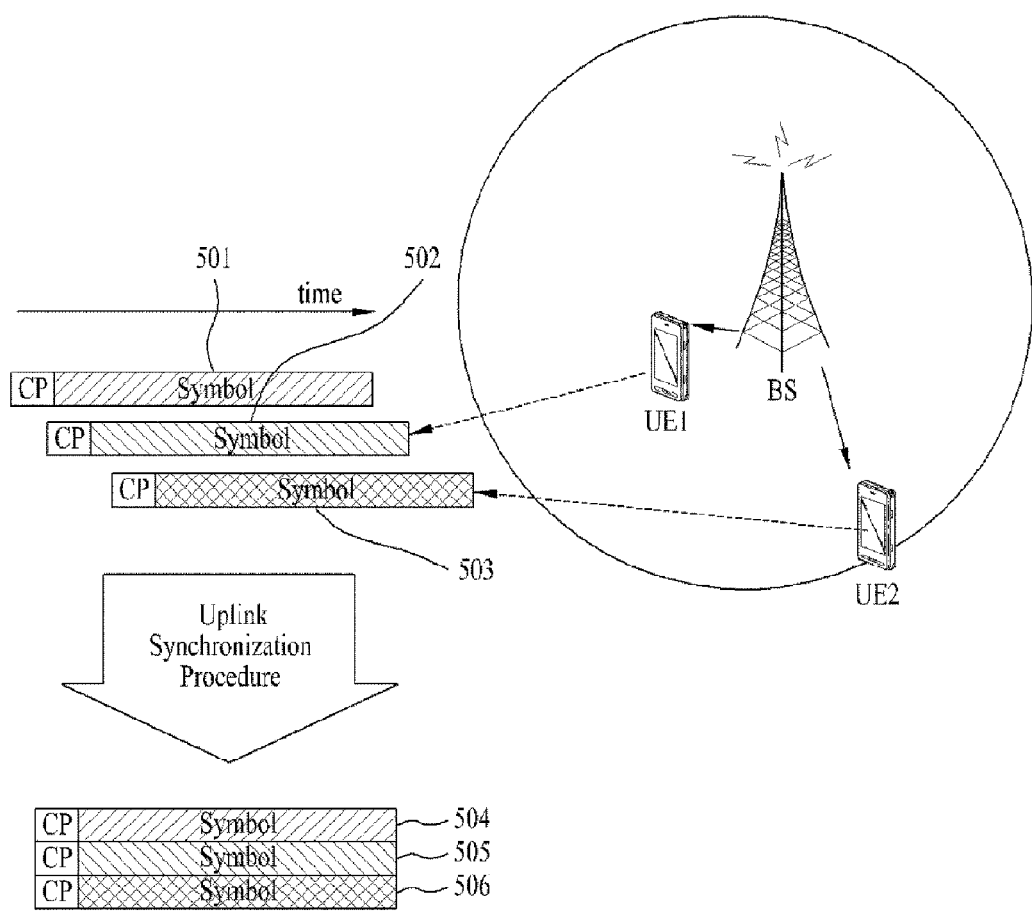
FIG. 5 is a view showing necessity and function of an uplink timing synchronization procedure in a 3GPP LTE system to which an Orthogonal Frequency Division Multiplexing (OFDM) method is applied.

FIG. 5 is a view showing necessity and function of an uplink timing synchronization procedure in a 3GPP LTE system to which an OFDM method is applied.

Referring to FIG. 5, a UE1 is located close to a BS, and a UE2 is located more distant from the BS than the UE1. Propagation delay time is time required in radio transmission from a BS to a UE (or from a UE to a BS). It is assumed that first propagation delay time is time required in radio transmission between the UE1 and the BS, and second propagation delay time is time required in radio transmission between the UE2 and the BS. Since the distance between the UE2 and the BS is greater than that between the UE1 and the BS, the second propagation delay time is longer than the first propagation delay time.

Due to difference in distances between the respective UEs and the BS, uplink timing synchronization of the UE1 does not coincide with that of UE2.

501 indicates start timing at which the BS receives and decodes uplink OFDM, 502 indicates timing synchronization with respect to OFDM symbol uplink transmission of the UE1, and 503 indicates timing synchronization with respect to OFDM symbol uplink transmission of the UE2. It can be seen that receiving timings of the OFDM symbols 501 to 503 are different from one another due to the propagation delay time as previously described. Consequently, the uplink symbols transmitted from the UE1 and UE2 are not orthogonal to each other, and therefore, the uplink symbols transmitted from the UE1 and UE2 interfere with each other. As a result, it is not possible for the BS to successfully decode the uplink symbols 502 and 503 transmitted from the UE1 and the UE2.

An uplink timing synchronization procedure is a procedure to synchronize uplink symbol receiving timings of the UE1, the UE2, and the BS. Upon completing the uplink timing synchronization procedure, decoding timing of uplink OFDM symbols as in 504 to 506 may coincide with one another at the respective UEs and the BS.

The uplink timing synchronization procedure is achieved by the UE distant from the BS transmitting the uplink OFDM symbol at earlier timing and the UE close to the BS transmitting the uplink OFDM symbol at later timing. That is, in the uplink timing synchronization procedure, the BS transmits timing advance (hereinafter, referred to as TA) information to the UEs to provide information to what extent timing is to be adjusted. At this time, the TA may be transmitted through a Timing Advance Command MAC Control Element (hereinafter, referred to as a TAC MAC CE). Alter-natively, the TA may be transmitted through a Random Access Response (hereinafter, referred to as an RAR) with respect to a random access preamble transmitted by the UE for initial access. As a result, the UE may adjust an uplink transmission point based on the received TA information.

The UE, having received the TA information from the BS at subframe n, may adjust timing based on the TA information from subframe n+6. The TA information is information instructing advance or delay in a multiple unit of 16 Ts based on the current uplink timing.

When the BS transmits the TA information to the UE, a difference value between a currently used TA value and a previously used TA value may be transmitted to the UE although an absolute value of the TA can be transmitted to the UE. For example, it is assumed that a currently used TA value is TA1, and a TA value to be newly applied is TA2. In this case, the BS transmits only a difference value between the TA2 and TA1, i.e. Δ(=TA2−TA1), to the UE. The UE, having receiving Δ(=TA2−TA1), may add Δ(=TA2−TA1) to TA1 to deduce TA2 to be newly applied.

When decoding timing is adjusted using the above method, the uplink symbols transmitted from the UE1 and UE2 are orthogonal to each other, and therefore, it is not possible for the BS to successfully decode the uplink symbols transmitted from the UE1 and the UE2.

Description of Coordinated Multipoint (CoMP)

The term 'CoMP' is a short for 'coordinated multipoint.' CoMP transmission may be a kind of transmission between a plurality of BS and a single UE.

Figure 6:
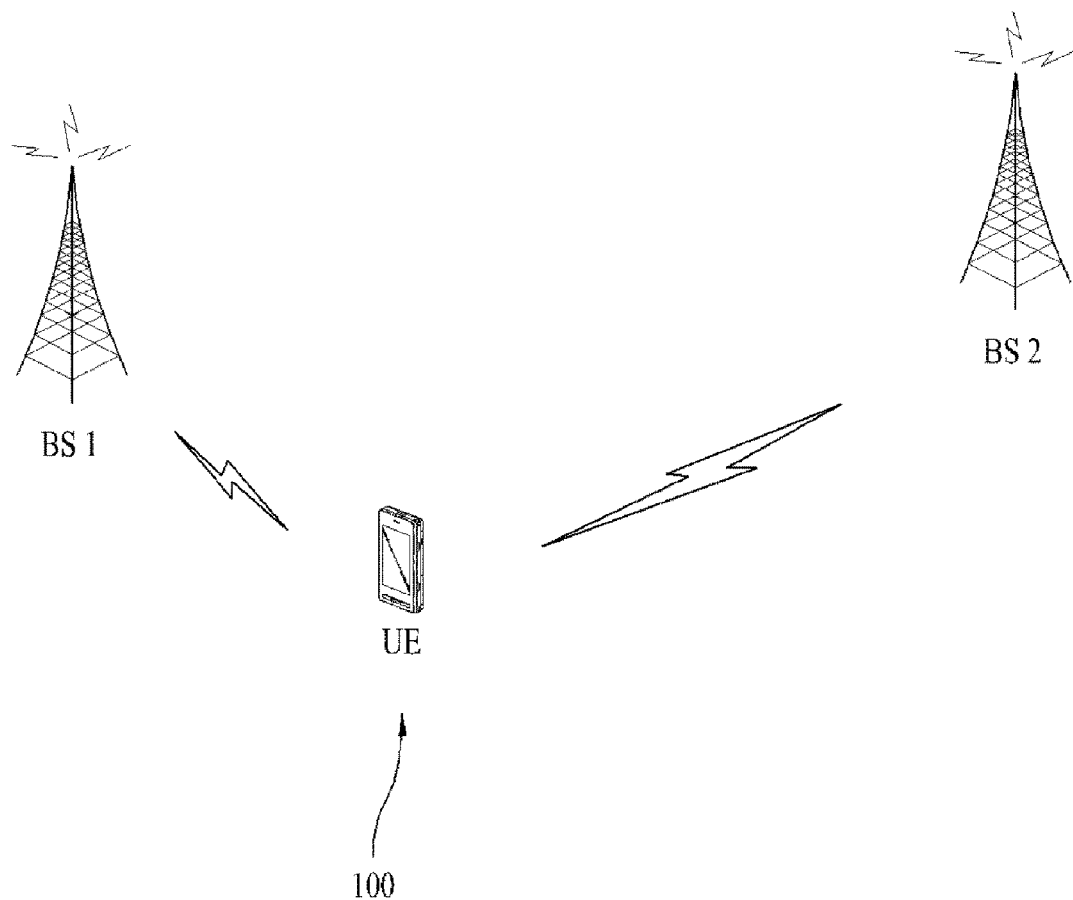
FIG. 6 is a view schematically showing a communication system to which a coordinated multipoint (CoMP) method is applied.

FIG. 6 is a view schematically showing a communication system 100 to which a CoMP method is applied. The communication system 100 may be an LTE-A system in which CoMP transmission is used. In an embodiment shown in FIG. 6, the communication system 100 includes two base stations BS 1 and BS 2 and a UE.

CoMP transmission is a method of providing simultaneous real time downlink transmission from two or more access nodes to one or more UEs in two overlapped cells. The cells are geographical areas served by the access nodes.

In the CoMP transmission method, BS 1 and BS 2 transmit signals to the UE through identically scheduled frequency-time resources. In this case, the UE achieves improved signal quality through combined transmission from both BS 1 and BS 2.

Also, in the CoMP transmission method, the UE may transmit signals to BS 1 and BS 2 through combined transmission. In a case in which the CoMP transmission method is used as described above, the UE receives or transmits data from or to a plurality of BSs, thereby improving data transmission speed.

In a case in which the UE utilizes identically scheduled frequency-time resources to transmit uplink signals using the CoMP transmission method, however, the same TA value is used, which may cause problems. In an example of FIG. 6, the distance between BS2 and the UE is greater than that between BS1 and the UE. As a result, time taken until the uplink signal transmitted from the UE reaches BS1, one of the destinations, may be different from that taken until the uplink signal transmitted from the UE reaches BS2, the other destinations. In a case in which the same TA is applied to the uplink signal transmitted to BS 1 and the uplink signal transmitted to BS 2, therefore, it is not possible to achieve coincidence with correct decoding timings as previously described with reference to FIG. 5.

Therefore, embodiments of the present invention, which will hereinafter be described in detail, propose transmission of uplink signals through application of independent timing for each BS to which the CoMP transmission method is applied in order to solve the above problem.

Application of Independent Timing for Each BS

FIG. 7 is a view showing a wireless communication system according to an embodiment of the present invention to which independent timing is applied for each BS and a problem which may be generated in this system.

In an example shown in FIG. 7, a CoMP transmission method is applied to a wireless communication system, which includes BS 1, BS 2, and a UE. The UE is located closer to BS 1.

When the UE transmits an uplink signal using the CoMP transmission method, each subframe may be transmitted to one selected from among a plurality of base stations.

For example, the UE may perform uplink transmission using a dynamic point selection method. Specifically, one appropriate BS may be selected as a target receiving point from a plurality of BSs (or receiving points) participating in uplink CoMP operation in consideration of uplink resources and/or uplink channel status that can be used by the UE.

In another example, an SRS may be directed to a Macro eNB for downlink transmission, and a PUCCH or PUSCH may be directed to a Pico eNB or RRH, which is located closer than the Macro eNB, for uplink transmission, in a case in which a TDD wireless communication system is applied.

In an example shown in FIG. 7, the UE performs transmission to BS 1 through subframe n and performs transmission to BS 2 through subframe n+1, which is a frame placed after subframe n.

In this example, plural TA information according to an embodiment of the present invention may be applied. In applying the plural TA information, the UE differently applies timing applied when transmitting an uplink signal to BS 1 and timing applied when transmitting an uplink signal to BS 2. That is, the UE transmits an uplink signal to BS 1 at timing to which timing advance 1 (TA1) information is applied and an uplink signal to BS 2 at timing to which timing advance 2 (TA2) information is applied.

701 indicates an uplink subframe n which the UE transmits to BS 1 at timing to which TA1 is applied, and 702 indicates subframe n+1, which is the next subframe, i.e. an uplink subframe which the UE transmits to BS 2 at timing to which TA2 is applied.

Generally, the plural TA information has different values. This is because a TA information value is decided based on the distance between a user equipment and a base station, and the distance between the user equipment and the base station is not uniform. Particularly in a case in which it is necessary to perform sounding reference signal transmission at a downlink transmission point as in the TDD system, a signal arrival distance of a sounding reference signal directed to a Macro eNodeB for downlink transmission is different from that of a PUCCH, PUSCH, or SRS directed to a neighboring pico eNB or RRH for uplink transmission.

In a case in which the difference between the TA values applied to neighboring subframes is increased as described above when the UE successively transmits subframes, collision between the neighboring subframes may occur. Referring to the drawing, different TA values are applied to the subframe 701 and the subframe 702 with the result that specific regions of the uplink subframes overlap. 703 and 704 indicate overlapping regions of the subframe 701 and the subframe 702, respectively. It may be confused how the UE operates in the overlapping regions. This is because, in the overlapping regions, the uplink subframe must be transmitted to BS 1 and, at the same time, the uplink subframe must be transmitted to BS 2.

In order to solve the above problem, embodiments of the present invention propose adjusting the length of subframes. Even when the subframes overlap, overlapping regions may be avoided if it is possible to reduce the length of the subframes.

Embodiments of the present invention propose adjusting the length of subframes using two methods. A first method is a method of applying another independent TA to a sounding reference signal. A second method is a method of applying data rate matching to a PUSCH channel transmitted on an uplink. Hereinafter, the above two methods will be described in detail with reference to drawings.

Figure 8:
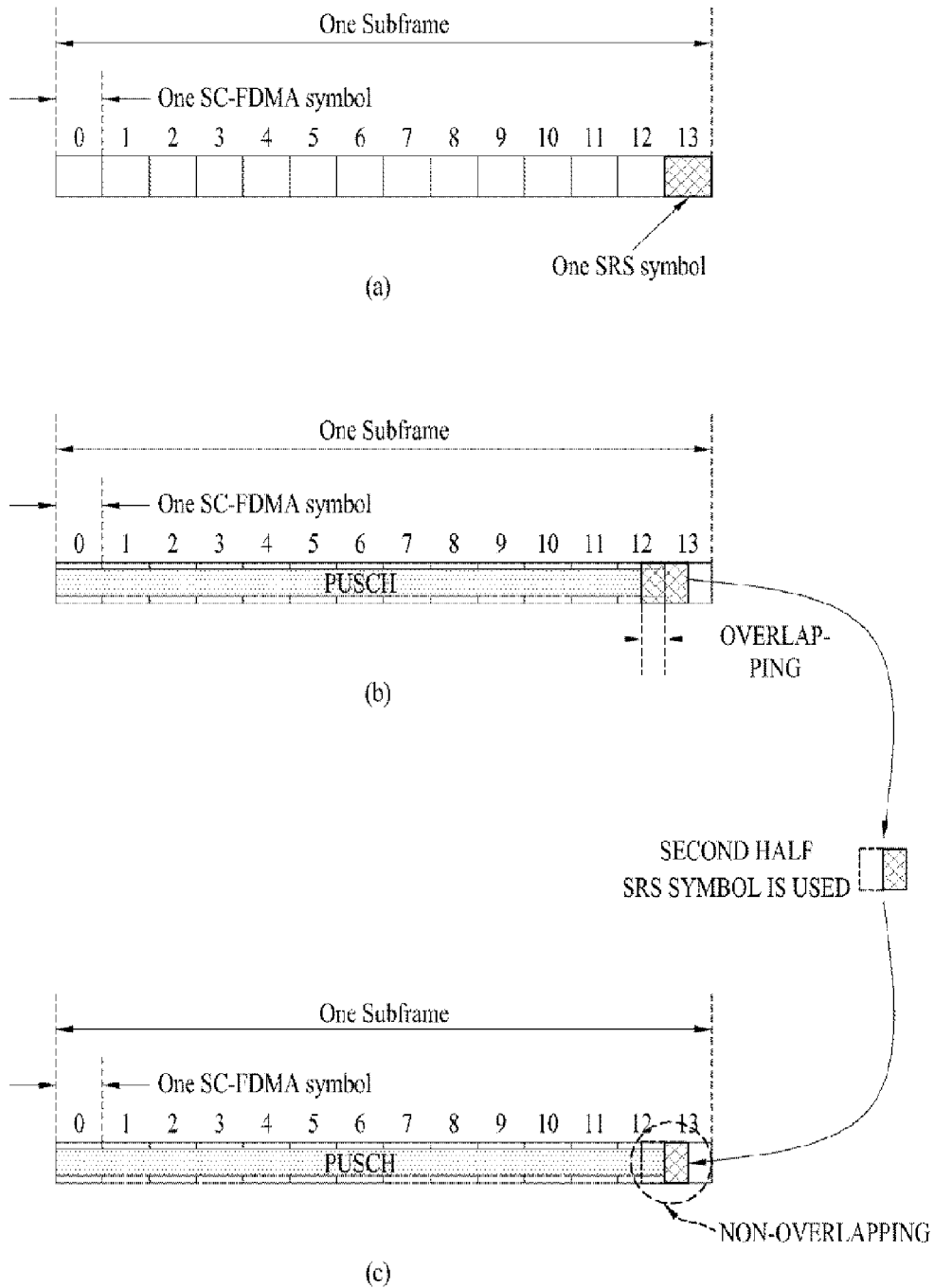
FIG. 8 is a view showing an example of a method of applying an independent timing advance (TA) to a sounding reference signal according to an embodiment of the present invention.

First Method of Adjusting Length of Subframes ? Application of Independent TA to Sounding Reference Signal FIG. 8 is a view showing an example of a method of applying an independent TA to a sounding reference signal according to an embodiment of the present invention. A UE may receive this independent TA from a BS through a TAC MAC CE.

Sounding reference signals are repeated at a predetermined offset and cycle according to a UE Specific SRS configuration. In embodiments of the present invention, an UE applying an independent TA to a sounding reference signal means applying an UE applying an independent TA to a SRS configuration. That is, the UE may apply an independent TA to all repeated sounding reference signals in a bundle.

In addition, in embodiments of the present invention, TA information may be applied to correspond to each UE Specific SRS configuration. That is, in a case in which the UE Specific SRS configuration has a configuration value of 0, TA0 may be applied. On the other hand, in a case in which the UE Specific SRS configuration has a configuration value of 1, TA1 may be applied. Consequently, a sounding reference signal transmitted according to a configuration value of 0 is transmitted at timing to which TA0 is applied, and a sounding reference signal transmitted according to a configuration value of 1 is transmitted at timing to which TA1 is applied.

In receiving a TA information value with respect to a UE Specific SRS configuration corresponding to such a specific configuration value, a sounding reference signal corresponding to a configuration value is transmitted at timing to which the received TA value is applied from a downlink signal receiving point, not at the existing uplink timing, if the TA information value is initially received.

On the other hand, in receiving a TA information value with respect to a UE Specific SRS configuration corresponding to such a specific configuration value, a sounding reference signal transmitted at the previous timing is transmitted at timing to which the received TA value is applied from a downlink signal receiving point if the TA information value is not initially received.

In the TDD system, in a case in which the UE receives a TA information value with respect to a UE Specific SRS configuration corresponding to a specific configuration value, the UE may be configured to apply the received TA information only when the sounding reference signal is transmitted through an UpPTS field of a special subframe. That is, when a sounding reference signal is transmitted through a general uplink subframe, not a special subframe, the UE may be configured to transmit the sounding reference signal at the existing general uplink timing without applying the received TA information value.

Meanwhile, in the same manner, in the TDD system, in a case in which the UE receives a TA information value with respect to a UE Specific SRS configuration corresponding to a specific configuration value, the UE may be configured to transmit a sounding reference signal transmitted through an UpPTS field at timing based on the received TA information value irrespective of whether the number of SC-FDMA symbols used in the UpPTS field is one or two.

In addition, in the same manner, in the TDD system, in a case in which the UE receives a TA information value with respect to a UE Specific SRS configuration corresponding to a specific configuration value, the UE may be configured to be applied to even a case in which not a periodically transmitted sounding reference signal but an aperiodic SRS (A-SRS) is transmitted through an UpPTS field of a special subframe.

FIG. 8(a) shows a general subframe, which includes 14 SC-FDMA symbols. The UE may transmit a sounding reference signal through the rearmost SC-FDMA symbol #13 of the subframe.

FIG. 8(b) shows an example in which an independent TA is applied to a sounding reference signal. The other SC-FDMA symbols #0 to #12 excluding SC-FDMA symbol #13 are assigned to a PUSCH channel. Since the independent TA is applied to this subframe, the position of the sounding reference signal in the subframe may be changed.

Referring to this drawing, the UE applies an independent TA to a sounding reference signal such that timing of the sounding reference signal is advanced by 0.5 SC-FDMA symbol. Consequently, it can be seen that the length of one subframe is reduced by 0.5 SC-FDMA symbol.

Also, as the UE applies the independent TA to the sounding reference signal, sounding reference signals overlap at SC-FDMA symbol #12 for PUSCH channel transmission. Therefore, an embodiment of the present invention proposes further adjusting the length of a sounding reference signal in a case in which a portion of the sounding reference signal overlap with a symbol assigned to another channel. That is, in a case in which an overlapping region between a symbol assigned to another channel, i.e. SC-FDMA symbol #13, and a sounding reference signal is less than 0.5 SC-FDMA symbol as shown in FIG. 8(b), it is proposed to use only half of the sounding reference signal.

FIG. 8(c) shows a case in which a second half SRS symbol is used. Referring to this drawing, it can be seen that transmission timing of a symbol assigned to a PUSCH channel and transmission timing of a sounding reference signal do not overlap. A method of adjusting the length of a sounding reference signal will hereinafter be described.

Adjusting Length of Sounding Reference Signal

FIG. 8 shows an example in which a second half SRS symbol is used. According to circumstances, a first half SRS symbol may be used. The first half SRS symbol or the second half SRS symbol means generation of a time-domain waveform corresponding to half of the length of one SC-FDMA symbol on a time axis. The time-domain waveform may be generated in various manners. In a representative example, if the total number of subcarriers on a frequency axis generating one SC-FDMA symbol is N, the number of the subcarriers is reduced to half, i.e. N/2. The interval between the subcarriers is increased to twice while the number of the subcarriers is reduced to N/2 such that a waveform on a time domain can be repeated twice during inverse fast Fourier transform (IFFT). At this time, a first half or a second half of the waveform may be used such that the length of the waveform is reduced to half.

If the waveform, the length of which is reduced to half, is arranged at the start point of the existing SC-FDMA symbol, a first half sounding reference signal may be used. ON the other hand, if the waveform is arranged at the end point of the existing SC-FDMA symbol, a second half sounding reference signal may be used.

In case of a sounding reference signal, the length of which is reduced to half, SRS sequence multiplexing divided into even tones and odd tones on a frequency axis cannot be used.

Figure 9:
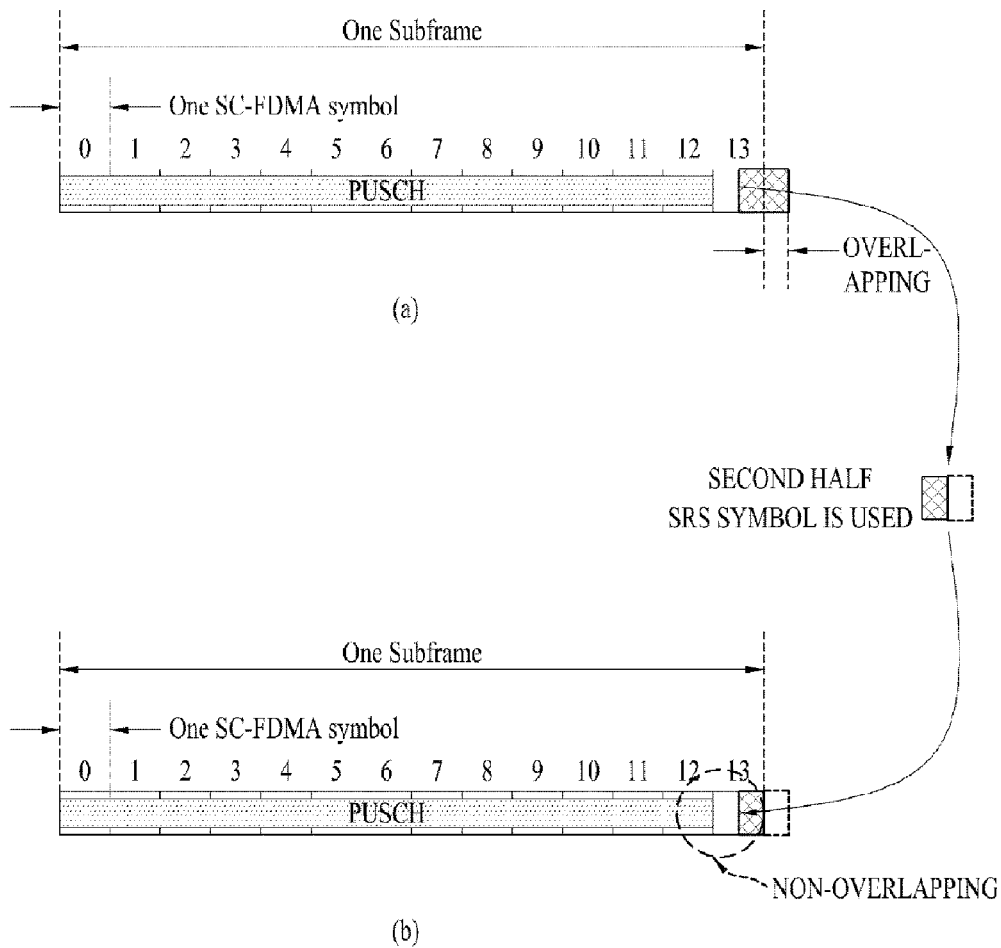
FIG. 9 is a view showing another example of a method of applying an independent timing advance (TA) to a sounding reference signal according to an embodiment of the present invention.

FIG. 9 is a view showing another example of a method of applying an independent TA to a sounding reference signal according to an embodiment of the present invention.

Referring to FIG. 9(a), a UE applies an independent TA to a sounding reference signal such that timing of the sounding reference signal is delayed by 0.5 SC-FDMA symbol. As the timing of the sounding reference signal is delayed as described above, an overlapping region between the sounding reference signal and the following subframe may be generated. FIG. 9(a) shows an overlapping region between a transmission section of a sounding reference signal and the following subframe as the result of adjusting timing of the sounding reference signal.

In a case in which the sounding reference signal overlap with another subframe as described above, only half of the sounding reference signal may be used according to an embodiment of the present invention, thereby avoiding generation of the overlapping region.

FIG. 9(b) shows a case in which only a first half sounding reference signal is used according to an embodiment of the present invention. Referring to this drawing, it can be seen that transmission timing of the sounding reference signal and transmission timing of the following subframe do not overlap.

Second Method of Adjusting Length of Subframes ? Rate Matching

FIGS. 8 and 9 show a case in which the adjustment length is less than 0.5 SC-FDMA symbol when the length of the subframes is adjusted. Hereinafter, a case in which the adjustment length is greater than 0.5 SC-FDMA symbol will be described with reference to FIG. 10.

Figure 10:
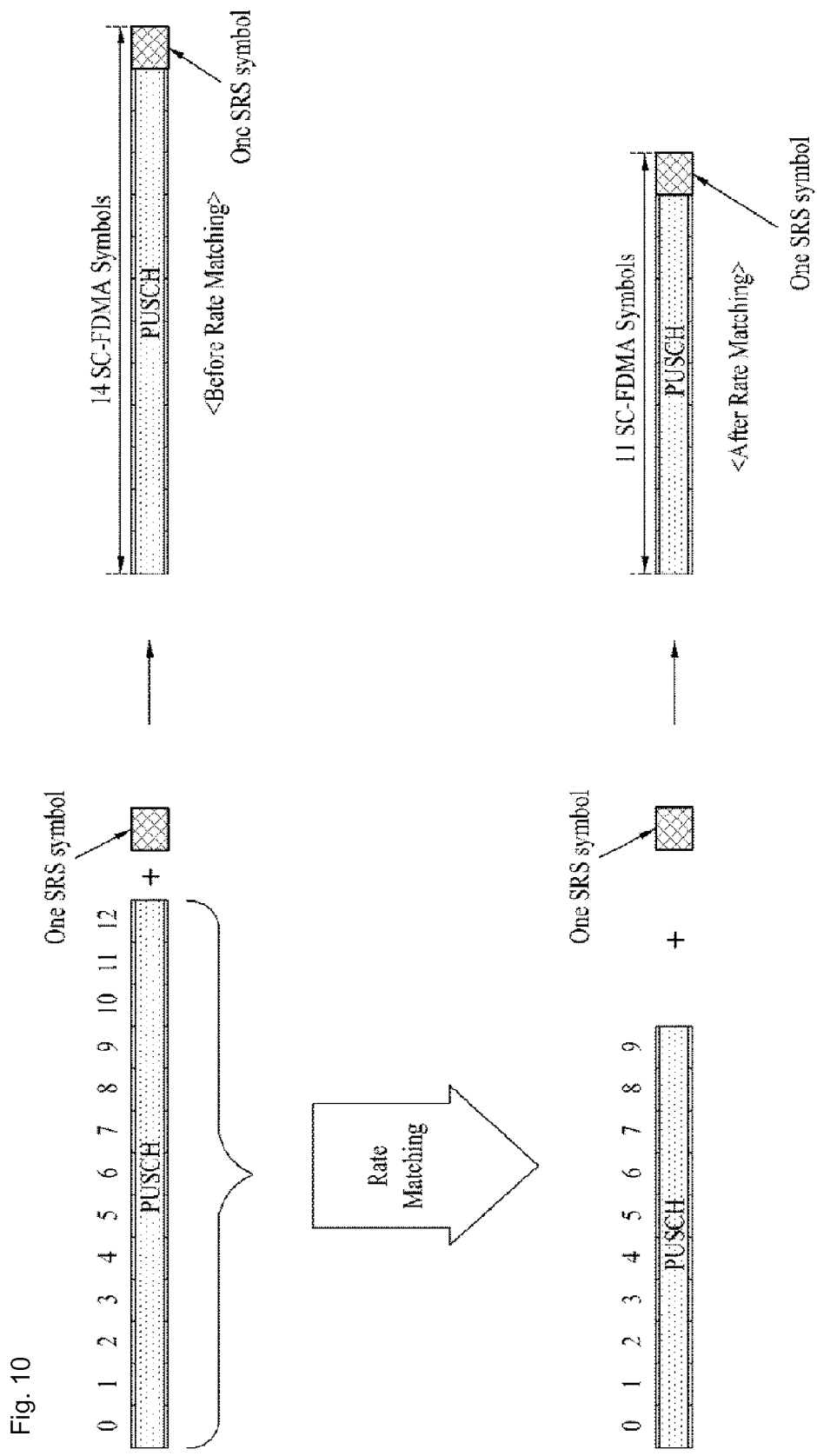
FIG. 10 is a view showing an example of a method of a User Equipment (UE) applying rate matching according to an embodiment of the present invention.

FIG. 10 is a view showing an example of a method of a UE applying rate matching according to an embodiment of the present invention. In a subframe shown in this drawing, thirteen SC-FDMA symbols are assigned to a PUSCH channel, and one SC-FDMA symbol is assigned to a sounding reference signal, before rate matching.

According to an embodiment of the present invention, the UE applies rate matching to the other symbols excluding a sounding reference signal in one subframe to adjust the length of the subframe. Referring to FIG. 10, the UE applies rate matching to reduce the number of symbols assigned to the PUSCH channel from thirteen to ten. That is, a method of performing rate matching by not transmitting SC-FDMA symbols #10 to #12, which are used before rate matching, is proposed. Even when the UE simultaneously performs uplink signal transmission and sounding reference signal transmission through the PUSCH channel, it is possible to prevent collision therebetween through the use of the above rate matching method.

It can be seen from the subframe after rate matching that the total length of the subframe is equivalent to eleven SC-FDMA symbols.

In addition, the UE may adjust a degree of rate matching to arbitrarily adjust the total length of the subframe. That is, it is possible to extend adjustment in length of the subframe transmitted in the embodiment of the present invention by adjusting the number of SC-FDMA symbols transmitted through rate matching.

As described above, the length of the subframe is adjusted using the above two methods. These two methods may be individually or simultaneously used. That is, the UE may reduce the length of a sounding reference signal to half through application of an independent TA to the sounding reference signal and, at the same time, reduce the length of a subframe through rate matching.

Meanwhile, a method of applying an independent TA to a sounding reference signal, one of the above methods, may be particularly useful in a special subframe of a TDD system. The reason will hereinafter be described in detail with reference to FIG. 11.

FIG. 11 is a view illustrating an embodiment of the present invention in a case in which a sounding reference signal is transmitted through a special subframe of a TDD system.

A UE applying an independent TA to a sounding reference signal may be particularly more useful when the sounding reference signal is transmitted through a special subframe of a TDD system. Therefore, another embodiment of the present invention proposes a UE applying an independent TA to only a sounding reference signal transmitted through a special subframe.

FIG. 11(a) shows an example of a special subframe. A configuration value is 0. In this case, of fourteen SC-FMDA symbols constituting the special subframe, three front symbols are DwPTS fields, and the rearmost symbol is an UpPTS field, as previously described with reference to Table 2. Of the fourteen SC-FMDA symbols, the other fields excluding the DwPTS fields and the UpPTS are GP fields.

A GP field is a specific field configured to secure downlink-uplink conversion time in consideration of delay until a UE really receives a downlink signal and uplink signal transmission time of the UE. Also, in a DwPTS and an UpPTS before and after the GP, some SC-FMDA symbols may be used for downlink transmission and uplink transmission. In this case, a representative signal that can be transmitted from the UpPTS field is a sounding reference signal. In an embodiment described with reference to FIG. 11, a UE applies an independent TA to a sounding reference signal from this UpPTS field.

FIG. 11(b) shows a case in which an independent TA is applied to a sounding reference signal transmitted through a special subframe according to an embodiment of the present invention.

Subframe #1 is a special subframe. The UE transmits a sounding reference signal to a Macro eNB through an UpPTS field present in this special subframe. As the UE applies the independent TA to the sounding reference signal, it can be seen that transmission timing of the sounding reference signal start from the middle of SC-FDMA symbol #12.

Subframe #2 is an uplink subframe. The UE transmits an uplink signal to a Pico-eNB through a PUSCH channel of subframe #2. That is, subframe #1 and subframe #2 transmit data signals to different base stations. According to an embodiment of the present invention, different TAs may be applied subframe #1 and subframe #2.

As the UE applies different TAs to subframe #1 and subframe #2, which are successively transmitted, as described above, collision between the transmitted subframes may occur.

In a case in which transmission timing based on application of an independent TA to a sounding reference signal transmitted from an UpPTS field according to a method proposed by the present invention is applied, however, it is possible to avoid collision between the successively transmitted subframes.

As the UE independently applies a TA to a sounding reference signal transmitted through SC-FDMA symbol #13 of subframe #1, a portion of the sounding reference signal escapes from an UpPTS field and enters a GP field region.

The GP field region is a field region for conversion from a downlink to an uplink. In the GP field region, uplink transmission of other data is not performed. Even when a portion of the sounding reference signal enters the GP field region, therefore, no problem occurs in transmitting the sounding reference signal. That is, it is possible for the UE to transmit the sounding reference signal even from the GP filed according to the independent TA of the sounding reference signal.

In a case in which a sounding reference signal is transmitted from a special subframe, therefore, necessity for adjusting the length of the sounding reference signal is reduced. That is, it is not necessary to transmit only a first half sounding reference signal of a second half sounding reference signal.

Therefore, an embodiment of the present invention proposes a UE applying an independent TA to only a sounding reference signal transmitted through a special subframe. Hereinafter, a method of configuring a UE Specific SRS such that the sounding reference signal can be transmitted through a special subframe will be described.

Method of Transmitting Sounding Reference Signal Through Only Special Subframe

In an example shown in FIG. 11(b), in a case in which TSRS is configured in a multiple form of 5 ms or 10 ms in a UE Specific SRS configuration, and Subframe Offset configuration Toffset is configured to a predetermined value when the UE performs transmission to a Macro eNB, a sounding reference signal targeting a Macro eNB may be transmitted through a special subframe.

Meanwhile, in the embodiment described with reference to FIG. 11, the special subframe has a configuration value of 0. In a case in which the configuration value is 0, only one SC-FDMA symbol is assigned to an UpPTS field. According to the configuration value of the special subframe, however, two SC-FDMA symbols may be assigned to the UpPTS field.

In a case in which two SC-FDMA symbols are assigned to the UpPTS field, the UE according to the embodiment of the present invention may transmit sounding reference signals from both the symbols. Also, in a case in which two SC-FDMA symbols are assigned to the UpPTS field, the UE may apply an independent TA to only one of the two sounding reference signals transmitted from the two symbols.

Another Embodiment of the Present Invention

Meanwhile, an EU according to another embodiment of the present invention may adjust a TA value such that subframes do not overlap even when independent TAs are applied to subframes through scheduling. For example, it is assumed that the UE applies TA1 to subframe #1 to transmit an uplink signal to BS 1 and applies TA2 to subframe #2, which follows subframe #1, to transmit an uplink signal to BS 2. In this case, subframe #1 and subframe #2 do not overlap when a value of TA1 is configured to be greater than that of TA2.

In an embodiment of the present invention, therefore, the UE may configure a value of TA1 applied to subframe #1 such that the value of TA1 is greater than that of TA2 applied to subframe #2, which follows subframe #1.

Yet Another Embodiment of the Present Invention

According yet another embodiment of the present invention, in a case in which some subframes overlap as the result of application of independent TAs, a UE suspends (or does not perform) transmission of any one of the overlapped subframes. For example, it is assumed that subframe #1 is a special subframe, a sounding reference signal, to which TA1 is applied through an UpPTS of this subframe, is transmitted, and subframe #1 is an uplink subframe, to which TA2 is applied. At this time, in a case in which transmission timing of the sounding reference signal and transmission timing of the uplink signal of subframe #2 overlap due to difference between values of TA1 and TA2, the UE according to the embodiment of the present invention delays or abandons transmission of the sounding reference signal and transmits only the uplink signal from subframe #2.

On the other hand, the UE may delay or abandon transmission of the uplink signal from subframe #2 and transmit only the sounding reference signal through subframe #1.

Figure 12:
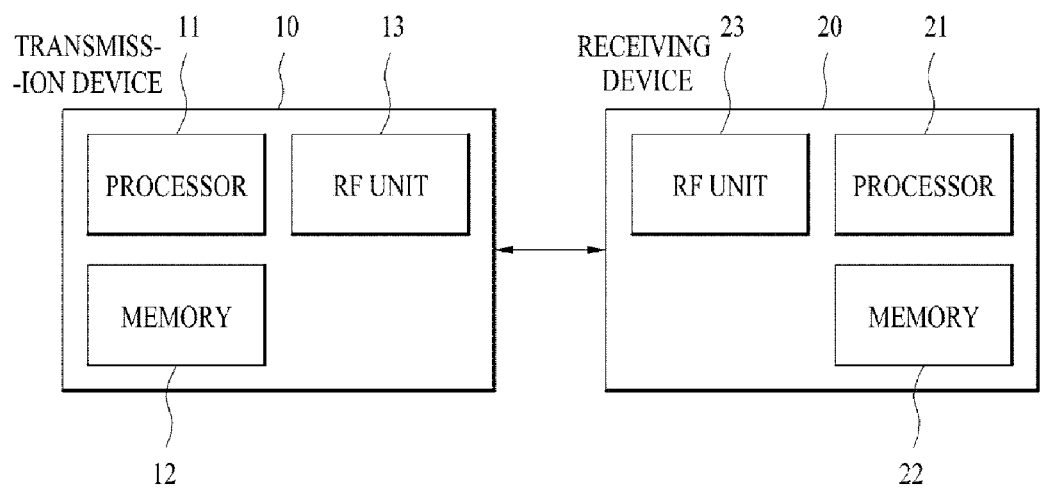
FIG. 12 is a block diagram showing components of a transmission device and receiving device performing the present invention.

FIG. 12 is a block diagram showing components of a transmission device 10 and receiving device 20 performing the present invention.

The transmission device 10 and receiving device 20 respectively include radio frequency (RF) units 13 and 23 to transmit or receive a wireless signal carrying information, data, signals, and/or messages, memories 12 and 22 to store various kinds of information related to communication in a wireless communication system, and processors 11 and 21 operatively connected to the RF units 13 and 23 and the memories 12 and 22 to control the memories 12 and 22 and/or the RF units 13 and 23 such that the transmission device 10 and receiving device 20 perform at least one of the above embodiments of the present invention.

The memories 12 and 22 may store programs to process and control the processors 11 and 21 and temporarily store input or output information. The memories 12 and 22 may be used as buffers.

Generally, the processors 11 and 21 control overall operations of various modules in the transmission device and receiving device. In particular, the processors 11 and 21 may perform various control functions to perform the present invention. The processors 11 and 21 may also be referred to as controllers, microcontrollers, micro-processors, or micro-computers. The processors 11 and 21 may be realized by hardware, firmware, software, or a combination thereof. In a case in which the present invention is realized using hardware, the processors 11 and 21 may include application specific integrated circuits (ASICs), digital signal processors (DSPs), digital signal processing devices (DSPDs), programmable logic devices (PLDs), or field programmable gate arrays (FPGAs). In a case in which the present invention is realized using firmware or software, on the other hand, the firmware or the software may be configured to include modules, procedures, or functions to perform functions or operations of the present invention. The firmware or the software configured to perform the present invention may be included in the processors 11 and 21 or stored in the memories 12 and 22 such that the firmware or the software can be driven by the processors 11 and 21.

The processor 11 of the transmission device 10 is scheduled by a scheduler connected to the processor 11 to code and modulate signals and/or data to be transmitted to the outside and to transmit the coded and modulated signals and/or data to the RF unit 13. For example, the processor 11 converts a data stream to be transmitted into K layers through demultiplexing, channel coding, scrambling, and modulation. The coded data stream may be referred to as code words. The coded data are equivalent to a transport block, which is a data block provided by an MAC layer. One transport block (TB) is coded into one code word. Each code word is transmitted to the receiving device in the form of one or more layers. The RF unit 13 may include an oscillator for frequency up-conversion. The RF unit 13 may include Nt (Nt is a positive integer equal to or greater than 1) transmit antennas.

A signal process procedure of the receiving device 20 is opposite to that of the transmission device 10. Under control of the processor 21, the RF unit 23 of the receiving device 20 receives a wireless signal transmitted by the transmission device 10. The RF unit 23 may include Nr receive antennas. The RF unit 23 frequency down-converts signals received through the receive antennas into baseband signals. The RF unit 23 may include an oscillator for frequency down-conversion. The processor 21 may decode and demodulate the wireless signals received through the receive antennas into the same data as those transmitted by the transmission device 10.

The RF units 13 and 23 include one or more antennas. According to an embodiment of the present invention, the antennas may transmit signals processed by the RF units 13 and 23 or receive wireless signals from the outside and transmit the received wireless signal to the RF units 13 and 23 under control of the processors 11 and 21. The antennas may also be referred to as antenna ports. Each antenna may correspond to one physical antenna or constituted by a combination of more than one physical antenna. A signal transmitted from each antenna cannot be decomposed any more. A reference signal (RS) transmitted in correspondence to a corresponding antenna defines an antenna viewed from a viewpoint of the receiving device 20. The reference signal enables the receiving device 20 to estimate the antenna irrespective of whether a channel is a single wireless channel from one physical antenna or a composite channel from a plurality of physical antenna elements including the antenna. That is, an antenna is defined such that a channel transmitting a symbol on the antenna can be deduced from the channel transmitting another symbol on the same antenna. An RF unit supporting a multi-input multi-output (MIMO) function to transmit and receive data using a plurality of antennas may be connected to two or more antennas.

In embodiments of the present invention, a UE serves as the transmission device 10 on an uplink and as the receiving device 20 on a downlink. In embodiments of the present invention, a BS serves as the receiving device 20 on an uplink and as the transmission device 10 on a downlink. Hereinafter, a processor, an RF unit, and a memory included in a UE are referred to as a UE processor, a UE RF unit, and a UE memory, respectively, and a processor, an RF unit, and a memory included in a BS are referred to as a BS processor, a BS RF unit, and a BS memory, respectively.

According to embodiments of the present invention, the BS processor controls the BS RF unit to transmit a TA applied to transmission of a sounding reference signal, and UE processor controls the UE RF unit to receive the TA. According to embodiments of the present invention, the UE processor controls the UE RF unit to transmit a sounding reference signal and/or uplink data (PUSCH) to the BS and to receive a sounding reference signal and/or uplink data (PUSCH) from the BS.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The present invention may be embodied in other specific forms without departing from the spirit and essential features of the invention. Consequently, the above detailed description must not be limitedly interpreted but illustratively considered. The scope of the invention must be decided based on reasonable interpretation of the appended claims, and all modifications within an equivalent range of the present invention fall within the scope of the invention. The invention should not be limited to the specific embodiments described herein, but should be accorded the broadest scope consistent with the principles and novel features disclosed herein. Also, claims which are not clearly recited may be combined to constitute other embodiments, or new claims may be added through amendment after filing of this application.

MODE FOR THE INVENTION

Various embodiments have been described in the best mode for carrying out the invention.

INDUSTRIAL APPLICABILITY

Embodiments of the present invention as described may be applied to a variety of mobile communication systems.

The invention claimed is:

1. A method of a User Equipment (UE) performing uplink transmission in a wireless communication system, the method comprising:
   receiving a first timing advance (TA) applied to transmission of a first sounding reference signal (SRS) and a second TA applied to transmission of uplink data from a first base station; and
   transmitting the first SRS according to a timing decided based on the first TA and transmitting the uplink data according to a timing decided based on the second TA,
   wherein if a transmission section of the uplink data overlaps with a transmission section of the first SRS due to a difference between values of the first TA and the second TA, a symbol length of the first SRS is reduced.

2. The method according to claim 1, wherein the transmitting comprises transmitting the first SRS to the first base station and transmitting the uplink data to a second base station.

3. The method according to claim 1, wherein the first SRS is an SRS conforming to a first transmission rule to periodically transmit SRSs,
   a second SRS is an SRS conforming to a second transmission rule, and
   the method further comprises transmitting the second SRS or a Physical Uplink Control Channel (PUCCH) according to the timing decided based on the second TA.

4. The method according to claim 3, wherein the first transmission rule or the second transmission rule is a UE Specific SRS configuration.

5. The method according to claim 3, wherein the wireless communication system is a Time Division Duplex (TDD) system, and the first transmission rule is configured such that the first SRS is transmitted from an Uplink Pilot Time Slot (UpPTS) of a special subframe.

6. The method according to claim 5, wherein the first transmission rule has an SRS transmission cycle value configured to n*5 ms (n is an integer) and an SRS transmission offset value configured to a position value of the special subframe such that the SRS is transmitted from the special subframe.

7. The method according to claim 1, wherein the first TA is a bias value of the second TA.

8. The method according to claim 1, wherein when the symbol length of the first SRS is reduced, the number of subcarriers of a frequency axis to generate symbols of the first SRS is reduced and inverse fast Fourier transform (IFFT) based on the reduced number of subcarriers is performed.

9. The method according to claim 1, wherein if the overlapping transmission section is greater than half a length of a Single Carrier frequency-division multiple access Symbol (SC-FDMA Symbol), rate matching of the uplink data is performed.

10. The method according to claim 1, wherein the uplink data are transmitted to the base station through a Physical Uplink Shared Channel (PUSCH).

11. A method of a Base Station receiving uplink data from a UE in a wireless communication system, the method comprising:
    transmitting a first timing advance (TA) applied to transmission of a first sounding reference signal (SRS) and a second TA applied to transmission of uplink data to the UE; and receiving the first SRS transmitted according to a timing decided based on the first TA and receiving the uplink data transmitted according to a timing decided based on the second TA from the UE wherein if a transmission section of the uplink data overlaps with a transmission section of the first SRS due to a difference between values of the first TA and the second TA, a symbol length of the first SRS is reduced.

12. A UE to perform uplink transmission in a wireless communication system, the UE comprising:
- a receiving module to receive a downlink signal from a base station;
- a transmitting module to transmit an uplink signal to the base station; and
- a processor configured to control the receiving module and the transmitting module to control an operation of the UE, wherein the processor is further configured to:
receive a first timing advance (TA) applied to transmission of a sounding reference signal (SRS) and a second TA applied to transmission of uplink data from a first base station through the receiving module; and
transmit the SRS according to a timing decided based on the first TA and transmit the uplink data according to a timing decided based on the second TA through the transmitting module, wherein if a transmission section of the uplink data overlaps with a transmission section of the first SRS due to a difference between values of the first TA and the second TA, a symbol length of the first SRS is reduced.

13. A Base Station to receive an uplink signal transmitted from a UE in a wireless communication system, the Base Station comprising:
- a receiving module to receive an uplink signal from the UE;
- a transmitting module to transmit a downlink signal to the UE; and
- a processor configured to control the receiving module and the transmitting module to control an operation of the Base Station, wherein the processor is further configured to:
transmit a first timing advance (TA) applied to transmission of a sounding reference signal (SRS) and a second TA applied to transmission of uplink data to the UE through the transmitting module; and
receive the SRS transmitted according to a timing decided based on the first TA and receive the uplink data transmitted according to a timing decided based on the second TA from the UE through the receiving module, wherein if a transmission section of the uplink data overlaps with a transmission section of the first SRS due to a difference between values of the first TA and the second TA, a symbol length of the first SRS is reduced.

* * * * *